United States Patent
Berkemeier et al.

(10) Patent No.: US 10,486,670 B2
(45) Date of Patent: Nov. 26, 2019

(54) BRAKE BOOSTER SYSTEM, AND METHOD FOR ASSISTING A BRAKING OPERATION OF A MOTOR VEHICLE

(71) Applicant: Ford Global Technologies, LLC, Dearborn, MI (US)

(72) Inventors: Oliver Berkemeier, Bergisch Gladbach (DE); Martin Wirth, Remscheid (DE)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/784,061

(22) Filed: Oct. 13, 2017

(65) Prior Publication Data
US 2018/0105154 A1    Apr. 19, 2018

(30) Foreign Application Priority Data
Oct. 14, 2016    (DE) .................. 10 2016 220 041

(51) Int. Cl.
*B60T 13/14* (2006.01)
*F02M 37/00* (2006.01)
*B60T 13/52* (2006.01)

(52) U.S. Cl.
CPC .......... *B60T 13/148* (2013.01); *B60T 13/145* (2013.01); *B60T 13/52* (2013.01); *F02M 37/0023* (2013.01); *B60T 2260/00* (2013.01)

(58) Field of Classification Search
CPC .. B60T 13/148; B60T 13/145; B60T 2260/00; B60T 13/52; F02M 37/0023
See application file for complete search history.

(56) References Cited

U.S. PATENT DOCUMENTS

| 4,828,337 | A   | 5/1989  | Wagner et al. |
| 6,330,875 | B1  | 12/2001 | Bartley et al. |
| 6,491,353 | B2* | 12/2002 | Hackl ............... B60T 8/328 303/10 |
| 6,557,524 | B2* | 5/2003  | Tsunooka ........... B60T 13/52 123/179.18 |
| 8,752,475 | B2* | 6/2014  | Cunningham ...... B60T 17/02 303/11 |
| 8,875,848 | B2  | 11/2014 | Vollert et al. |
| 2011/0272228 | A1 | 11/2011 | Kunz et al. |

FOREIGN PATENT DOCUMENTS

| DE | 3627279 A1   | 3/1987 |
| DE | 10032185 A1  | 1/2002 |
| WO | 2010009921 A1 | 1/2010 |

* cited by examiner

*Primary Examiner* — Abiy Teka
(74) *Attorney, Agent, or Firm* — Geoffrey Brumbaugh; McCoy Russell LLP (57) ABSTRACT

A brake booster system for assisting a braking operation of a motor vehicle having a brake booster is provided. The brake booster system may include a pressure piston of a brake master cylinder, an actuating element which is configured for deflecting the pressure piston, and a brake booster which is divided into two chambers by way of a diaphragm, the first chamber is connected to the pressure piston and has a pressure p1 and the second chamber is connected to the actuating element and has a pressure p2. Furthermore, in the brake booster system, there is a pressure build up apparatus which is configured to raise the pressure p2 above the pressure p1 by way of said pressure build up apparatus.

19 Claims, 3 Drawing Sheets

BRAKE BOOSTER SYSTEM, AND METHOD FOR ASSISTING A BRAKING OPERATION OF A MOTOR VEHICLE

CROSS REFERENCE TO RELATED APPLICATION

The present application claims priority to German Patent Application No. 102016220041.0, filed on Oct. 14, 2016. The entire contents of the above-referenced application are hereby incorporated by reference in its entirety for all purposes.

FIELD

The present description relates generally to a brake booster system and to a method for assisting a braking operation in a motor vehicle having a brake booster.

BACKGROUND/SUMMARY

A brake booster system is described, in DE 36 41 105 A1 that includes a motor vehicle brake apparatus having a vacuum brake booster which is arranged between the actuating element and the brake master cylinder. Said vacuum brake booster comprises at least two working spaces which are separated from one another by way of a diaphragm plate. One of the working spaces can be connected to a vacuum source via a main solenoid valve and the other working space can be ventilated via a control valve which can be actuated by means of the actuating element, in order to generate a braking force which is proportional to the actuating element force. Brake circuits which load wheel brake cylinders are connected to the brake master cylinder. One drawback with the brake booster system disclosed in DE 36 41 105 A1 is that a vacuum pump is needed to charge the brake booster, thereby decreasing engine efficiency. Moreover, the vacuum pump increases the cost and complexity of the brake booster system and may be prone to malfunction, in some cases.

Against the background of that stated above and recognizing the aforementioned problems the inventors have developed a method for operation of a brake booster system. The method includes determining that an actuating element is being actuated, the actuating element coupled to a brake master cylinder and responsive to determining that the actuating element is being actuated, opening a first valve in a fuel line in fluidic communication with a fuel rail and providing fuel to a second pressure chamber, the second pressure chamber including a first piston disposed therein, the first piston mechanically connected to a second piston disposed in a first pressure chamber, the first pressure chamber in fluidic communication with a brake booster. The method further includes closing a second valve positioned in a fuel line providing fluidic communication between the second pressure chamber and a fuel line extending between a feed pump and a high pressure pump. In this way, fuel pressure from the fuel feed system can be used in a brake booster system to decrease a braking effort needed for actuation of a brake pedal or other suitable actuating element. Consequently, the fuel feed system is designed to provide dual-use functionality, thereby increasing engine efficiency. As a result, the brake booster system may omit a vacuum pump, if desired, to decrease the cost, complexity, and energy needs of the brake booster system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

It is an objective of the brake booster system and method for operation of such a system described herein to provide an apparatus which provides a pressure difference which is needed for a braking force that is proportional to the actuating element force. Furthermore, it is an objective of the brake booster system and method for operation of such a system described herein to provide braking operation assistance in a motor vehicle having a brake booster.

The first objective may be achieved by way of a brake booster system. The second objective may be achieved by way of a method for operating a brake booster system.

The present description discloses a brake booster system for assisting braking operation in a motor vehicle. The brake booster system may include a pressure piston of a brake master cylinder, an actuating element which is configured for deflecting the pressure piston, and a brake booster which is divided into two chambers by way of a diaphragm. The first chamber of the brake booster is connected to the pressure piston, whereas the second chamber of the brake booster is connected to the actuating element. A pressure p1 prevails in the first chamber, and a pressure p2 prevails in the second chamber. Furthermore, there is a pressure build up apparatus which is configured to raise the pressure p2 above the pressure p1 by way of said pressure build up apparatus. All pressures in said system are therefore greater than or equal to the ambient pressure p0, which may make a vacuum generation apparatus superfluous in said system, if desired. Furthermore, a pressure difference of over 1 bar can also be built up in the brake booster by way of the brake booster system described herein.

According to one refinement of the brake booster system, the pressure build up apparatus is connected to a fuel feed system. Furthermore, the brake booster system has a pressure removal point in the fuel feed system. At the pressure removal point pressure for raising the pressure p2 is removed from the fuel feed system. It will be appreciated that the pressure which prevails in the fuel feed system may be considerably higher than the ambient pressure p0.

In one exemplary refinement of the brake booster system, the pressure build up apparatus may include a pressure converter which is positioned between the pressure removal point and the second chamber of the brake booster. In such an example, the pressure converter has a first pressure chamber which is connected to the second chamber of the brake booster and a second pressure chamber which is connected to the pressure removal point. The pressure converter is configured to convert a pressure which prevails in the second pressure chamber into a lower pressure in the first pressure chamber. In such an example, the pressure converter acts at the same time as a separating element between two fluids, the first fluid (e.g., air or other suitable gas) prevailing in the first pressure chamber and the second fluid (e.g., a liquid fuel) prevailing in the second pressure chamber.

According to one refinement of the brake booster system, the pressure converter includes two pistons with different piston area sizes which are connected mechanically to one another. In such an example, the pistons are arranged in the two pressure chambers of the pressure converter. The piston area sizes are designed such that they convert the pressure p3 in the second pressure chamber into the pressure p2 in the first pressure chamber. The mechanical connection between the two pistons leads to a transmission of force between the two pistons. The transmission of force may be ascertained using the formula $p=F/A$, wherein A is an area and F is the force which acts on the area, is that $p2*A1=p3*A2$, wherein A1 is equal to the piston area in the first pressure chamber and A2 is equal to the piston area in the second pressure chamber. A pressure difference which is needed for the brake boosting can be set in the pressure converter in accordance with the ratio of the piston area sizes. The volume between the two pistons which surrounds the mechanical connection is connected to the surroundings in such a way that the pressure which influences the pressure conversion is prevented from building up between the two pistons during displacement of the pistons, in one example.

According to one refinement of the brake booster system, the fuel feed system is designed for a liquid fuel. Here, diesel or gasoline may be used as liquid fuel. As an alternative, any other liquid fuel can be used.

According to one refinement of the brake booster system, the fuel feed system has a fuel tank and a feed pump which is used for feeding the fuel to a fuel consumer. In such an example, the pressure removal point may be arranged downstream of the feed pump.

According to one refinement of the brake booster system, the fuel feed system has a high pressure pump which is used for a fuel injection unit. Furthermore, the fuel feed system has a throttling valve which is arranged between the second pressure chamber and the pressure removal point. In such an example, the throttling valve may be configured to reduce pressures of the fuel flowing therethrough by several orders of magnitude.

According to one refinement of the brake booster system, the throttling valve is a controllable valve. Furthermore, the pressure build up apparatus has a control device which is configured to control or to regulate the pressure in the second chamber of the brake booster and starting from the pressure at the pressure removal point such that a desired pressure level is achieved in the second chamber with the aid of the throttling valve. In such an example, the controllable valve can be controlled or regulated electronically or mechanically by the control device.

According to one refinement of the brake booster system, the pressure build up apparatus includes a connecting line between the second pressure chamber of the pressure converter and a pressure equalization point in the fuel feed system. In such an example, the pressure equalization point lies upstream of the high pressure pump. Furthermore, there may be a discharge valve in the connecting line. The pressure in the second pressure chamber of the pressure converter can be equalized with a pressure that occurs downstream of the discharge valve through operation of the discharge valve. As a result of the equalization of the pressure in the second pressure chamber of the pressure converter with a pressure downstream of the discharge valve, the pressure in the second pressure chamber of the pressure converter can be reduced. When, the pressure in the second chamber is reduced the pressure in the first pressure chamber of the pressure converter is reduced and the pressure in the second chamber of the brake booster is also reduced. As a result, a pressure equalization between the pressures p1 and p2 in the brake booster and a relief of the diaphragm can take place.

According to one refinement, the brake booster system has a restoring element which resets the diaphragm into a starting position in the case of an equalization of the pressure p2 in the second chamber with the pressure p1 in the first chamber. If the pressure p1 which prevails in the first pressure chamber is constantly kept equal to the ambient pressure p0, the restoring element can be, for example, a mechanically acting spring. The first pressure chamber which surrounds said spring may be connected to the surroundings so that the pressure p1 may be at all times equal to the ambient pressure p0. As an alternative, the restoring element functionality can be achieved by hermetically sealing the first pressure chamber which is filled with a gas. In the case of an increase in the pressure p2 in the second pressure chamber, the gas in the first pressure chamber is compressed, resulting in movement of the diaphragm into the first pressure chamber. The gas in the first pressure chamber expands again when the pressure in the second pressure chamber is discharged, causing the diaphragm to move back into its starting position.

In one advantageous refinement of the brake booster system, a gas can be used in the fluidic connection between the brake booster and the pressure converter.

In one example, a method for assisting braking operation in a motor vehicle having a brake booster is provided. In such an example, the brake booster includes a pressure piston of a brake master cylinder, an actuating element which is configured for deflecting the pressure piston, and a brake booster which is divided into two chambers by way of a diaphragm. The first chamber of the brake booster is connected to the pressure piston and has a pressure p1. The second chamber of the brake booster is connected to the actuating element and has a pressure p2. In the method, the pressure p2 is raised to a pressure level above the pressure p1 responsive to actuation of the actuating element. In such an example, the pressure p1 may be constantly held equal to the ambient pressure p0. The actuating element may be a manual actuating element, such as a brake pedal, in one example. The advantages which are achieved by way of the method described herein correspond to those which have been described in relation to the apparatus described herein.

According to one refinement of the method, the pressure p2 may be removed from a fuel feed system of the motor vehicle.

In the following text, one exemplary embodiment for a brake booster system 1 in a motor vehicle 60 having a brake booster 2 is described with regard to FIG. 1.

Figure 1:
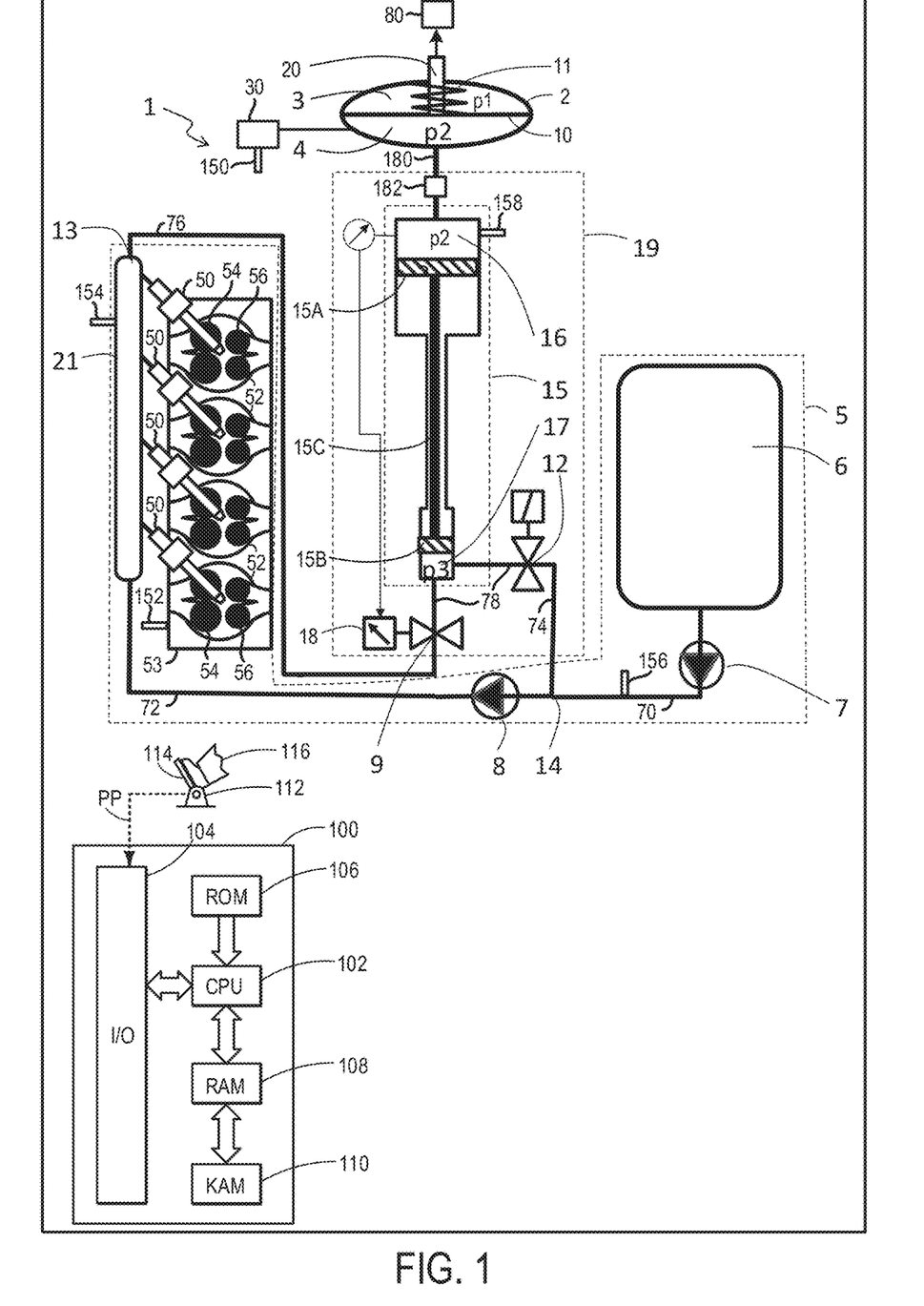
FIG. 1 schematically shows a diagrammatic illustration of an engine with a brake booster system having a brake booster, a pressure build up apparatus, and a fuel feed system.

FIG. 1 shows a brake booster system 1 which can be used to assist in braking operation in a motor vehicle. In modern motor vehicles, brake booster systems may include a brake booster which is divided into two chambers by way of a diaphragm. The brake booster may be evacuated partially, in one example. One of the special features of the brake booster system 1 described herein is that pressures within the individual chambers 3, 4 of the brake booster 2 are greater than or equal to the ambient pressure p0.

The pressure difference which is needed for a braking operation is produced by virtue of the fact that a pressure p2 in the second chamber 4 of the brake booster 2 which faces an actuating element is increased. In the case of the increase in the pressure p2 in the second chamber 4 of the brake booster 2, a pressure p1 in the first chamber 3 of the brake booster 2 which faces away from the actuating element is constantly kept equal to the ambient pressure p0 in the present exemplary embodiment, for example by virtue of the fact that the first chamber 3 is open toward the surroundings, with the result that it communicates with the surroundings. The pressure energy which is needed for the pressure increase of p2 is removed from a fuel feed system 5 of the motor vehicle.

FIG. 1 shows a diagrammatic construction of the brake booster system 1 for assisting a braking operation of a motor vehicle 60 having the brake booster 2. In said exemplary embodiment, the brake booster system 1 includes the brake booster 2 and a pressure build up apparatus 19 which interacts with a fuel feed system 5.

In said exemplary embodiment, the brake booster 2 includes of two chambers 3, 4 which are separated from one another by way of a diaphragm 10. The first chamber 3 of the brake booster is connected to a pressure piston 20 of a brake master cylinder. It will be appreciated that brake circuits 80 which load wheel brake cylinders may be connected to the brake master cylinder, in one example. The deflection of the pressure piston 20 takes place via an actuating element 30. Here, the actuating element is connected to the second chamber 4 of the brake booster 2. Additionally or alternatively, the actuating element 30 may be mechanically coupled to the pressure piston 20. It will be appreciated that movement of the pressure piston 20 may generate brake actuation via the pressurization of brake fluid in brake lines.

A pressure p1 prevails in the first chamber 3 of the brake booster 2, whereas a pressure p2 prevails in the second chamber 4. If no force is exerted on the actuating element, the two pressures p1 and p2 are of equal magnitude. In the case of an actuation of the actuating element, a pressure difference is produced between the first chamber 3 and the second chamber 4. Whereas the pressure p1 is usually reduced in the first chamber 3 with respect to the ambient pressure p0, the pressure p1 may be constantly held equal to the ambient pressure p0, in one example. In order to realize the pressure difference, the pressure in the second chamber 4 of the brake booster 2 is increased. In a motor vehicle having an internal combustion engine, pressures of approximately 200 bar for gasoline and approximately 2000 bar for diesel prevail in the fuel feed system 5, in one example. A fraction of the pressure, in the fuel feed system, can be utilized to produce a pressure difference in the brake booster 2. To this end, the fuel feed system 5 has a pressure removal point 13, at which the pressure build up apparatus 19 removes pressure from the fuel feed system 5.

FIG. 1 shows an internal combustion engine 53 in the vehicle 60. The engine 53 includes a high pressure in the fuel feed system that includes a fuel tank 6, a feed pump 7, a high pressure pump 8 and a fuel injection unit 21. A fuel line 70 provides fluidic communication between the feed pump 7 and the high pressure pump 8. Additionally, a fuel line 72 provides fluidic communication between the high pressure fuel pump 8 and the fuel injection unit 21.

In this exemplary embodiment, the fuel in the fuel tank 6 is increased to a pressure of 5 bar by way of the feed pump 7. However, the feed pump 7 may be designed to increase the fuel pressure by a different amount, in other examples.

The high pressure pump 8 further increases the pressure in the fuel. In this exemplary embodiment, a liquid fuel such as gasoline, diesel, alcohol (e.g., methanol or ethanol), or combinations thereof may be used in the fuel feed system. If gasoline is used as fuel, the increase in the pressure in the fuel feed system may be approximately 200 bar, whereas the use of diesel in the fuel feed system may result in the increase to approximately 2000 bar. However, other high pressure pump configurations that increase the pressure of the fuel by different amounts have been contemplated.

Additionally, in one example, the fuel injection unit 21 may be a fuel rail providing pressurized fuel to fuel injectors 50 coupled directly to the cylinders 52 in an internal combustion engine 53. Intake valve 54 and exhaust valves 56 are coupled to the cylinders 52. The intake valve 54 are configured to open and close to provide selective fluidic communication between the cylinders 52 and an intake system. The intake system may include conventional components such as a throttle, intake manifold, air filter, etc. The exhaust valves 56 are configured to open and close to provide selective fluidic communication between the cylinders 52 and an exhaust system. The exhaust system may include conventional components such as an exhaust manifold, emission control devices (e.g., filters, catalysts, etc.,), exhaust conduits, etc. Furthermore, during operation, each cylinder 52 within the engine 53 may typically undergo a four stroke cycle: the cycle includes the intake stroke, compression stroke, expansion stroke, and exhaust stroke.

The connection between the brake booster 2 and the fuel feed system 5 takes place via a pressure build up apparatus 19. The pressure build up apparatus 19 is configured to build up a pressure p2 in the second chamber 4 of the brake booster. Specifically in one example, when the pressure p2 lies above the ambient pressure p0, the pressure build up apparatus 19 may remove a pressure downstream of the high pressure pump 8, converts it and conducts the converted pressure into the second chamber 4 of the brake booster 2. In such an example, the pressure is reduced by several orders of magnitude.

In this exemplary embodiment, the pressure build up apparatus 19 that provides the connection between the brake booster 2 and the fuel feed system 5 includes a pressure converter 15 and two valves 9, 12. A return fuel line 74 provides fluidic communication between the valve 12 and the fuel line 70. Additionally, a fuel line 76 provides fluidic communication between the fuel injection unit 21 and the valve 9. Furthermore, fuel lines 78 provide fluidic communication between the second pressure chamber 17 and valves 9, 12.

The pressure converter 15 includes two pistons 15A, 15B which are connected mechanically to one another. In this exemplary embodiment, the mechanical connection is a piston rod 15C, with the result that the identical magnitude of a force F acts on the two pistons 15A, 15B. In this exemplary embodiment, the pistons 15A, 15B move in each case in a piston cylinder and form a first and a second pressure chamber 16, 17 with the respective cylindrical walls, for example. The pressure in the two pressure chambers 16, 17 (p2 in the first pressure chamber 16 and p3 in the second pressure chamber 17) are of different magnitudes. The pressure difference in the two pressure chambers 16, 17 is dependent on the respective piston area A in the two pressure chambers 16, 17. The piston area A2 in the first pressure chamber 16 is greater than the piston area A3 in the second pressure chamber 17. In accordance with the equation $p3*A3=F=p2*A2$, the pressure p2 in the first pressure chamber 16 is therefore lower than the pressure p3 in the second pressure chamber 17.

In this exemplary embodiment, the first pressure chamber 16 of the pressure converter 15 is connected fluidically to the second chamber 4 of the brake booster 2 on one side. Specifically, a booster line 180 provides fluidic communication between the second chamber 4 and the first pressure chamber 16. In one example, a valve 182 may be disposed within the booster line 180. However, in other examples, the valve 182 may be omitted from the brake booster system 1. When the valve 182 is open the same pressures therefore prevail in the second chamber 4 of the brake booster 2 and in the first pressure chamber 16 of the pressure converter 15. However, when the valve 182 is closed the brake booster system 1 may be deactivated and prevents pressure equalization between the second chamber 4 and the first pressure chamber 16. On the other side, the pressure converter 15 is fluidically connected via the second pressure chamber 17 to a pressure removal point 13 in the fuel feed system 5. The pressure removal point 13 may be a port in a fuel rail. In this exemplary embodiment, a throttling valve 9 which is a closable valve is situated in a fuel line extending between the second pressure chamber 17 and the fuel injection unit 21. The valve 9 (e.g., throttling valve) may be designed to reduce of the pressure of the fuel flowing therethrough. Specifically, the valve 9 may reduce the pressure of the fuel received at the inlet of the valve (e.g., a pressure substantially equivalent to the pressure at the pressure removal point 13 which may be approximately 200 bar in the case of the use of gasoline or approximately 2000 bar in the case of the use of diesel, to 50 bar or less, for example). Thus, the pressure in the second pressure chamber 17 of the pressure converter 15 may be less than the pressure in the fuel injection unit 21.

The pressure (e.g., 50 bar) that may be in the second pressure chamber 17 of the pressure converter 15 may be converted to a pressure in the first pressure chamber 16 of the pressure converter 15 of approximately 1 bar above the pressure p1 in the first chamber 3 of the brake booster 2, in one example. In such an example, the pressure p1 in the first chamber 3 of the brake booster corresponds to the ambient pressure p0. However, other pressure conversion amounts in the pressure build up apparatus 19 have been contemplated.

The increase in the pressure in the second chamber 4 of the brake booster 2 is controlled or regulated via a pressure sensor system 18 in the case of the actuation of the actuating element. As soon as the actuating element is actuated and an actuating force acts on the actuating element, the valve 9 may be opened, with the result that the pressure in the second pressure chamber 17 of the pressure converter 15 is increased. On account of the pressure increase in the second pressure chamber 17, an increasing force acts on the piston 15B in the second pressure chamber 17. Said force is transmitted by the piston rod 15C to the piston 15A in the first pressure chamber 16, with the result that the pressure in the first pressure chamber 16 of the pressure converter 15 rises on account of the transmitted force, until an equilibrium is reached. The pressure p2 in the second chamber 4 of the brake booster 2 is increased correspondingly. As soon as a force acts on the actuating element, a pressure difference therefore prevails between the two chambers 3, 4 of the brake booster. Said pressure difference which is 1 bar, in the present exemplary embodiment, exerts a force on the diaphragm 10 in the brake booster 2, which force deflects said diaphragm 10 out of a starting position. The deflection of the diaphragm 10 in the brake booster 2 assists the braking operation.

If no more actuating force acts on the actuating element, the valve 9 may be closed. In this exemplary embodiment, there is a connection between the second pressure chamber 17 of the pressure converter 15 and a pressure equalization point 14 in the fuel feed system 5. The pressure equalization point 14 is arranged upstream of the high pressure pump 8, for a reduction in the pressure in the second pressure chamber 17 of the pressure converter 15. In this exemplary embodiment, a discharge valve 12 is situated in said fluidic connection. The discharge valve 12 is opened as soon as an equalization occurs between the second pressure chamber 17 of the pressure converter 15 and the fuel feed system 5. The result of this is that the valve 9 and the discharge valve 12 are not open at the same time.

As soon as the discharge valve 12 is open, the pressure in the second pressure chamber 17 of the pressure converter 15 is reduced, as a result of which the pressure in the first pressure chamber 16 of the pressure converter 15 decreases and the diaphragm 10 in the brake booster 2 is relieved. By means of a restoring element 11 of the brake booster 2 which is configured as a spring in the present exemplary embodiment, the diaphragm 10 is reset into its starting position in the case of an equalization of the pressure p2 in the second chamber 4 to the pressure p1 in the first chamber 3.

The utilization of a pressure which is present in a fuel feed system 5 for producing a pressure difference in a brake booster 2 makes an evacuation of a first chamber of a brake booster 2 superfluous, if desired.

The present brake booster system and engine have been described in detail for illustration purposes using one exemplary embodiment. A person skilled in the art recognizes, however, that deviations from the exemplary embodiment are possible. Thus, in one alternative refinement, the first chamber 3 can be closed hermetically instead of being open toward the surroundings, with the result that it does not communicate with the surroundings. The chamber 3 may then filled with a gas which is compressed in the case of an increase in the pressure p2 in the second chamber 4, with the result that the gas volume is decreased and a movement of the diaphragm into the first chamber 4 occurs. When the pressure p2 is discharged from the second chamber 4 again, the gas in the first pressure chamber expands again, with the result that the diaphragm moves back into its starting position. In every refinement of the brake booster, moreover, a pressure difference of below 1 bar or above 1 bar can also be set instead of a pressure difference of 1 bar, for instance a pressure difference of 0.75 bar or of 1.5 bar. Other pressure difference values than the ones indicated are also possible, however, as a person skilled in the art readily recognizes. The brake booster system is therefore not to be restricted by the exemplary embodiment, but rather merely by the appended claims.

FIG. 1 also shows a controller 100. The controller 100 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 100 is shown receiving various signals from sensors coupled to engine 53 including: an actuating element position sensor 150; engine coolant temperature (ECT) from temperature sensor 152; a position sensor 112 coupled to an accelerator pedal 114 for sensing force applied by foot 116; a pressure sensor 154 coupled to the fuel injection unit 21; a pressure sensor 156 coupled to fuel line 70; and/or a pressure sensor 158 coupled to the second pressure chamber 16.

The controller 100 may also be configured to control adjustment of various engine components such as the feed pump 7, the high pressure pump 8, the fuel injectors 50, valve 9, valve 12, and valve 182. For instance, the controller 100 may send a command signal to valve 9 to adjust the degree of opening or closing of the valve. Responsive to receiving the command signal an actuator (e.g., solenoid) in the valve 9 may be operated according to the valve adjustment command. It will be appreciated that other engine components may also include actuators and may be controlled in this way. In yet another example, the degree of opening of the valve 9 and/or valve 12 may be empirically determined and stored in predetermined lookup tables or functions. For example, one table may correspond to determining valve actuation timing for valve 9 and one table may correspond to valve actuation timing for valve 12. The tables may be indexed to engine operating conditions, such as fuel rail pressure, engine speed, and engine load, among other engine operating conditions.

Figure 2:
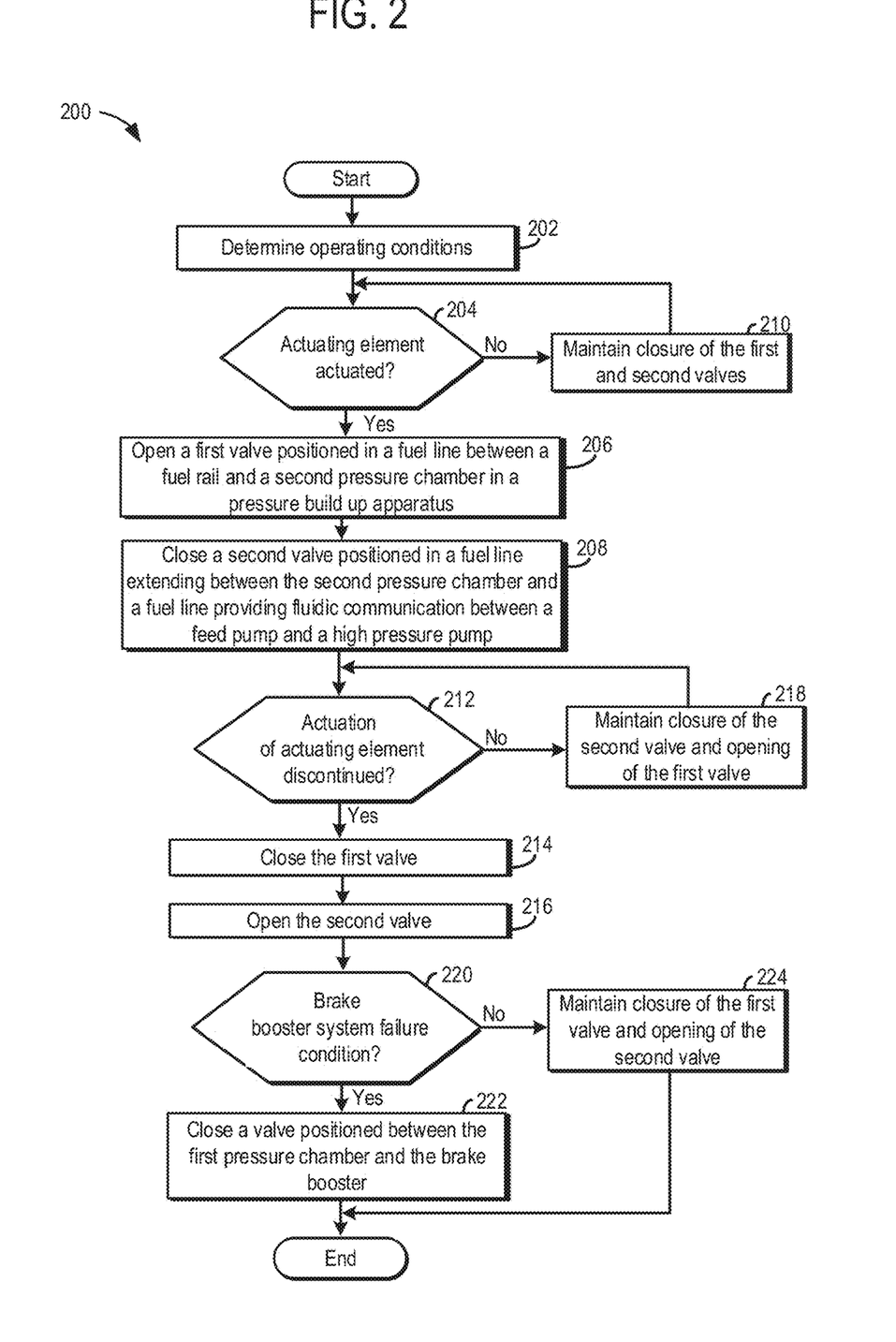
FIGS. 2 and 3 show different methods for operating a brake booster system.

FIG. 2 shows a method 200 for operation of an engine with brake booster system. Method 200 may be implemented by the engine and brake booster system described above with regard to FIG. 1 or may be implemented by other suitable engines and brake booster systems, in other examples. Instructions for carrying out the method 200 and other methods described herein may be executed by a controller, such as controller 100 shown in FIG. 1, based on instructions stored in memory (e.g., non-transitory) of the controller and in conjunction with signals received from sensors of in the engine and corresponding systems, such as the sensors described above with reference to FIG. 1. The controller may employ engine actuators of the engine systems to adjust engine operation, according to the methods described below.

At 202 the method includes determining engine operating conditions. Engine operating conditions may include actuating element state (e.g., actuated or non-actuated), fuel rail pressure, engine temperature, feed pump output, high pressure pump output, etc.

At 204 the method includes determining if an actuating element has been actuated. The actuating element is attached to a brake booster. Specifically in one example, the actuating element may be a brake pedal coupled to a pressure piston of a brake master cylinder. Thus, actuating the actuating element may include the depression of a brake pedal by a driver. However, in other examples the actuating element may be another suitable mechanism.

If it is determined that the actuating element has been actuated (YES at 204) the method advances to 206. At 206 the method includes opening a valve positioned in a fuel line between a fuel rail and a second pressure chamber in a pressure build up apparatus. In this way, pressurized fuel in the fuel system can be used for brake boosting. In one example, opening the valve may include opening the valve by a selected amount to throttle fuel flowing therethrough to decrease the pressure of the fuel provided to the second pressure chamber. The degree of valve opening may be selected based on braking demand (e.g., degree of brake pedal actuation) in the vehicle and/or fuel rail pressure, in one example.

Next at 208 the method includes closing a second valve positioned in a fuel line extending between the second pressure chamber and a fuel line providing fluidic communication between a feed pump and a high pressure pump. It will be appreciated that in one example, steps 206 and 208 may be implemented at concurrent or overlapping time intervals. In this way, pressure in the fuel feed system can be transferred to the second pressure chamber.

However, if it is determined that the actuating element has not been actuated (NO at 204) the method advances to 210. At 210 the method includes maintaining closure of the first and second valves. However, in other examples, step 210 may include closing the first and second valves.

Next at 212 the method includes determining if actuation of the actuating element has been discontinued. Actuation of the actuating element may be discontinued when it is sensed that a driver has stopped depressing a brake pedal, for instance. If it is determined that actuation of the actuating element has been discontinued (YES at 212) the method advances to 214. At 214 the method includes closing the first valve. Next at 216 the method includes openings the second valve. It will be appreciated that step 216 may be implemented subsequent to step 214. It will be appreciated that once the first valve is opened pressure in the second pressure chamber may equalize with the pressure in the fuel line positioned between the feed pump and the high pressure pump. By releasing discharge from the second pressure chamber into the fuel feed system between the pumps, pumping efficiency in the system can be increased when compared to systems that may discharge fuel into a fuel tank. In this way, the brake booster system may be essentially deactivated when braking assistance via the brake booster system is not needed.

However, if it is determined that actuation of the actuating element has not been discontinued (NO at 212) the method proceeds to 218. At 218 the method includes maintaining closure of the second valve and opening of the first valve. In this way, the brake booster system can continue to provide braking assistance.

Next at 220 the method includes determining there is a brake booster system failure condition. The brake booster system failure condition may include malfunction of the pressure converter, malfunction of the first valve, and/or malfunction of the second valve, for example.

If it is determined that there is a brake booster system failure condition (YES at 220) the method advances to 222. At 222 the method includes closing a valve positioned between the first pressure chamber and the brake booster. In this way, the brake booster system can be essentially shutdown, when a failure in the system is recognized.

However, if it is determined that there is not a brake booster system failure condition (NO at 220) the method proceeds to 224. At 224 the method includes maintaining closure of the first valve and opening of the second valve. However, in other examples, step 224 may include maintaining closure of the first valve and closure the second valve. Method 200 enables a brake booster system to leverage pressure from a fuel feed system to assist in brake boosting. In this way, the fuel feed system is designed with dual-use functionality, thereby increasing engine efficiency.

Figure 3:
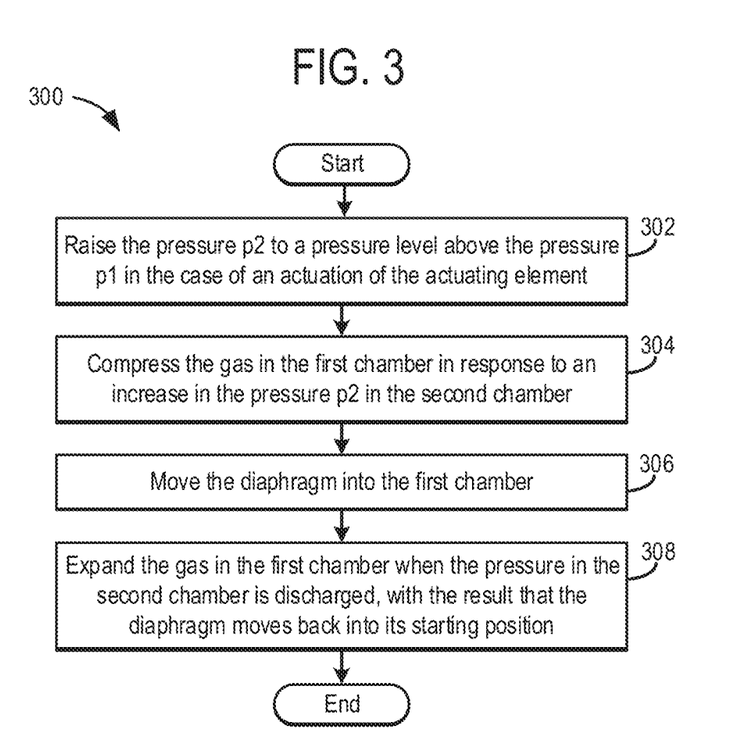

FIG. 3 shows a method 300 for operation of an engine with a brake booster system. The brake booster system may include, in one example, a pressure piston of a brake master cylinder, an actuating element which is configured for deflecting the pressure piston, and a brake booster which is divided into a first chamber and a second chamber by way of a diaphragm, the first chamber being connected to the pressure piston and having a pressure p1, and the second chamber being connected to the actuating element and having a pressure p2. However, it will be appreciated that in other examples, other suitable brake booster systems may be used to implement the method 300 such as other variants of the brake booster system described above with regard to FIG. 1.

At 302 the method includes raising the pressure p2 to a pressure level above the pressure p1 in the case of an actuation of the actuating element, where the pressure p2 is removed from a fuel feed system of the motor vehicle. In one example, the pressure p1 in the first pressure chamber is constantly kept equal to the ambient pressure p0.

Further in one example, the first chamber is closed hermetically and is filled with a gas. In such an example, the method may include steps 304-308. At 304 the method includes compressing the gas in the first chamber in response to an increase in the pressure p2 in the second chamber. Next at 306 the method includes moving the diaphragm into the first chamber. At 308 the method includes expanding the gas in the first chamber when the pressure in the second chamber is discharged, with the result that the diaphragm moves back into its starting position.

The invention will further be described in the following paragraphs. In one aspect, a brake booster system for assisting a braking operation of a motor vehicle is provided. The brake booster system includes a pressure piston of a brake master cylinder, an actuating element which is configured for deflecting the pressure piston, and a brake booster which is divided into a first chamber and a second chamber by way of a diaphragm, the first chamber being connected to the pressure piston and having a pressure p1, and the second chamber being connected to the actuating element and having a pressure p2, where the first chamber is configured in such a way that there is a pressure build up apparatus which is configured such that the pressure p2 can be raised above the pressure p1 by way of said pressure build up apparatus.

In another aspect, a method for assisting a braking operation of a motor vehicle having a brake booster which includes a pressure piston of a brake master cylinder, an actuating element which is configured for deflecting the pressure piston, and a brake booster which is divided into a first chamber and a second chamber by way of a diaphragm, the first chamber being connected to the pressure piston and having a pressure p1, and the second chamber being connected to the actuating element and having a pressure p2 is provided. The method includes raising the pressure p2 to a pressure level above the pressure p1 in the case of an actuation of the actuating element, where the pressure p2 is removed from a fuel feed system of the motor vehicle.

In another aspect, a method for operation of a brake booster system is provided. The method includes determining that an actuating element is being actuated, the actuating element coupled to a brake master cylinder, responsive to determining that the actuating element is being actuated, opening a first valve in a fuel line in fluidic communication with a fuel rail and providing fuel to a second pressure chamber, the second pressure chamber including a first piston disposed therein, the first piston mechanically connected to a second piston disposed in a first pressure chamber, the first pressure chamber in fluidic communication with a brake booster, and closing a second valve positioned in a fuel line providing fluidic communication between the second pressure chamber and a fuel line extending between a feed pump and a high pressure pump.

In any of the aspects or combinations of the aspects, the pressure build up apparatus may be connected to a fuel feed system and has a pressure removal point in the fuel feed system, at which pressure removal point pressure for raising the pressure p2 is removed from the fuel feed system.

In any of the aspects or combinations of the aspects, the pressure build up apparatus may include a pressure converter which acts between the pressure removal point and the second chamber of the brake booster, the pressure converter having a first pressure chamber which is connected to the second chamber of the brake booster and a second pressure chamber which is connected to the pressure removal point, and said pressure converter being configured to convert a pressure which prevails in the second pressure chamber into a lower pressure in the first pressure chamber.

In any of the aspects or combinations of the aspects, the pressure converter may include two pistons with different piston area sizes which are connected mechanically to one another, the pistons being arranged in the two pressure chambers of the pressure converter, and the piston area sizes being configured to convert the pressure p3 in the second pressure chamber into the pressure p2 in the first pressure chamber.

In any of the aspects or combinations of the aspects, the fuel feed system may be a fuel feed system for a liquid fuel.

In any of the aspects or combinations of the aspects, the fuel feed system may have a fuel tank and a feed pump which is used for feeding the fuel to a fuel consumer, and the pressure removal point is arranged downstream of the feed pump.

In any of the aspects or combinations of the aspects, the fuel feed system may have a high pressure pump which is used for a fuel injection unit and a throttling valve which is arranged downstream of the high pressure pump, and the pressure removal point is arranged downstream of the throttling valve.

In any of the aspects or combinations of the aspects, the throttling valve may be a controllable valve and the pressure build up apparatus has a control device which is configured to control or to regulate the pressure p3 in the second chamber of the brake booster to a desired pressure level with the aid of the throttling valve, starting from the pressure at the pressure removal point.

In any of the aspects or combinations of the aspects, the pressure build up apparatus may include a connecting line between the pressure converter and a pressure equalization point in the fuel feed system, which pressure equalization point lies upstream of the high pressure pump, and there is a discharge valve in the connecting line, by way of which discharge valve the pressure in the second pressure chamber of the pressure converter can be equalized with a pressure which occurs downstream of the discharge valve.

In any of the aspects or combinations of the aspects, the brake booster system may have a restoring element which resets the diaphragm into a starting position in the case of an equalization of the pressure p2 in the second chamber to the pressure p1 in the first chamber.

In any of the aspects or combinations of the aspects, the restoring element may be a mechanically acting spring.

In any of the aspects or combinations of the aspects, the restoring element may include the first pressure chamber that is closed hermetically and is filled with a gas, the gas in the first pressure chamber being compressed in the case of an increase in the pressure p2 in the second pressure chamber, and a movement of the diaphragm into the first pressure chamber taking place as a result, and the gas in the first pressure chamber expanding again when the pressure in the second pressure chamber is discharged, with the result that the diaphragm moves back into its starting position.

In any of the aspects or combinations of the aspects, the pressure p1 in the first pressure chamber may be constantly kept equal to the ambient pressure p0.

In any of the aspects or combinations of the aspects, the first chamber may be closed hermetically and is filled with a gas and where the method may further include compressing the gas in the first chamber in response to an increase in the pressure p2 in the second chamber, moving the diaphragm into the first chamber, and expanding the gas in the first chamber when the pressure in the second chamber is discharged, with the result that the diaphragm moves back into its starting position.

In any of the aspects or combinations of the aspects, the method may further include determining actuation of the actuating element has been discontinued and closing the first valve responsive to determining actuation of the actuating element has been discontinued.

In any of the aspects or combinations of the aspects, the method may further include, subsequent to closing the first valve, opening the second valve.

In any of the aspects or combinations of the aspects, the method may further include in response to determining a brake booster system failure condition, closing a valve positioned between the first pressure chamber and the brake booster.

In any of the aspects or combinations of the aspects, the method may further include opening the first valve includes throttling fuel flowing through the first valve to reduce the pressure of the fuel based on a fuel rail pressure.

FIG. 1 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A brake booster system for assisting a braking operation of a motor vehicle, comprising:
    a pressure piston of a brake master cylinder;
    an actuating element which is configured for deflecting the pressure piston;
    a brake booster which is divided into a first chamber and a second chamber by way of a diaphragm, the first chamber connected to the pressure piston and having a pressure p1, and the second chamber connected to the actuating element and having a pressure p2; and
    a pressure build up apparatus designed to raise the pressure p2 above the pressure p1 in the brake booster and is in adjustable fluidic communication with a fuel feed system upstream and downstream of a high pressure fuel pump, where the high pressure fuel pump is positioned downstream of a feed pump.

2. The brake booster system of claim 1, where the pressure build up apparatus is in fluidic communication with a fuel rail upstream of the high pressure fuel pump and has a pressure removal point in the fuel feed system, at which pressure removal point pressure for raising the pressure p2 is removed from the fuel feed system.

3. The brake booster system of claim 2, where the pressure build up apparatus comprises a pressure converter which acts between the pressure removal point and the second chamber of the brake booster, the pressure converter having a first pressure chamber which is connected to the second chamber of the brake booster and a second pressure chamber which is connected to the pressure removal point, and said pressure converter being configured to convert a pressure which prevails in the second pressure chamber into a lower pressure in the first pressure chamber.

4. The brake booster system of claim 3, where the pressure converter comprises two pistons with different piston area sizes which are connected mechanically to one another, the two pistons being arranged in the two pressure chambers of the pressure converter, and the piston area sizes being configured to convert a pressure p3 in the second pressure chamber into the pressure p2 in the first pressure chamber.

5. The brake booster system of claim 3, where the pressure build up apparatus comprises a connecting line between the pressure converter and a pressure equalization point in the fuel feed system, where the pressure equalization point lies upstream of the high pressure fuel pump, and where there is a discharge valve in the connecting line, by way of which discharge valve the pressure p2 in the second pressure chamber of the pressure converter can be equalized with a pressure which occurs downstream of the discharge valve.

6. The brake booster system of claim 2, where the fuel feed system has a fuel tank.

7. The brake booster system of claim 2, where the high pressure fuel pump which is used for a fuel injection unit and the fuel feed system include a throttling valve which is arranged downstream of the high pressure fuel pump, and the pressure removal point is arranged downstream of the throttling valve.

8. The brake booster system of claim 7, where the throttling valve is a controllable valve and the pressure build up apparatus has a control device which is configured to control or to regulate a pressure p3 in the second chamber of the brake booster to a desired pressure level with the aid of the throttling valve, starting from the pressure at the pressure removal point.

9. The brake booster system of claim 2, further comprising a restoring element which resets the diaphragm into a starting position in a case of an equalization of the pressure p2 in the second chamber to the pressure p1 in the first chamber.

10. The brake booster system of claim 9, where the restoring element is a mechanically acting spring.

11. The brake booster system of claim 9, where the restoring element includes the first pressure chamber that is closed hermetically and is filled with a gas, where the gas in the first pressure chamber being compressed in the case of an increase in the pressure p2 in the second pressure chamber, and where a movement of the diaphragm into the first pressure chamber taking place as a result, and the gas in the first pressure chamber expanding again when the pressure in the second pressure chamber is discharged, resulting in the diaphragm moving back into its starting position.

12. A method for assisting a braking operation of a motor vehicle having a brake booster which comprises a pressure piston of a brake master cylinder, an actuating element configured for deflecting the pressure piston, and where the brake booster is divided into a first chamber and a second chamber by way of a diaphragm, the first chamber connected to the pressure piston and having a pressure p1, and the second chamber connected to the actuating element and having a pressure p2, the method comprising:
  responsive to determining that the actuating element is being actuated, raising the pressure p2 to a pressure level above the pressure p1 in a case of an actuation of the actuating element by opening a first valve in a fuel line in fluidic communication with a fuel feed system upstream of a high pressure fuel pump to provide fuel to the second chamber, where the high pressure fuel pump is positioned downstream of a feed pump.

13. The method of claim 12, where the pressure p1 in the first pressure chamber is constantly kept equal to the ambient pressure p0.

14. The method of claim 12, where the first chamber is closed hermetically and is filled with a gas and where the method further comprises:
  compressing the gas in the first chamber in response to an increase in the pressure p2 in the second chamber;
  moving the diaphragm into the first chamber; and
  expanding the gas in the first chamber when the pressure in the second chamber is discharged, resulting in the diaphragm moving back into its starting position.

15. A method for operation of a brake booster system comprising:
  determining that an actuating element is being actuated, the actuating element coupled to a brake master cylinder;
  responsive to determining that the actuating element is being actuated, opening a first valve in a fuel line in fluidic communication with a fuel rail and providing fuel to a second pressure chamber, the second pressure chamber including a first piston disposed therein, the first piston mechanically connected to a second piston disposed in a first pressure chamber, the first pressure chamber in fluidic communication with a brake booster; and
  closing a second valve positioned in a fuel line providing fluidic communication between the second pressure chamber and a fuel line extending between a feed pump and a high pressure pump.

16. The method of claim 15, further comprising determining actuation of the actuating element has been discontinued and closing the first valve responsive to determining actuation of the actuating element has been discontinued.

17. The method of claim 16, further comprising, subsequent to closing the first valve, opening the second valve.

18. The method of claim 15, further comprising in response to determining a brake booster system failure condition, closing a valve positioned between the first pressure chamber and the brake booster.

19. The method of claim 15, where opening the first valve includes throttling fuel flowing through the first valve to reduce the pressure of the fuel based on a fuel rail pressure.

* * * * *